United States Patent
Guzman Cardozo

(10) Patent No.: US 10,955,362 B2
(45) Date of Patent: Mar. 23, 2021

(54) RAMAN SPECTROSCOPY AND MACHINE LEARNING FOR QUALITY CONTROL

(71) Applicant: BRASKEM AMERICA, INC., Philadelphia, PA (US)

(72) Inventor: Gustavo A. Guzman Cardozo, Pittsburgh, PA (US)

(73) Assignee: BRASKEM AMERICA, INC., Philadelphia, PA (US)

(*) Notice: Subject to any disclaimer, the term of this patent is extended or adjusted under 35 U.S.C. 154(b) by 49 days.

(21) Appl. No.: 16/376,642

(22) Filed: Apr. 5, 2019

(65) Prior Publication Data

US 2019/0310207 A1 Oct. 10, 2019

Related U.S. Application Data

(60) Provisional application No. 62/653,791, filed on Apr. 6, 2018.

(51) Int. Cl.
| | |
|---|---|
| *G01N 21/956* | (2006.01) |
| *G06N 20/20* | (2019.01) |
| *C08L 23/12* | (2006.01) |
| *G01J 3/44* | (2006.01) |
| *G01N 21/65* | (2006.01) |

(52) U.S. Cl.
CPC ........ *G01N 21/95607* (2013.01); *C08L 23/12* (2013.01); *G01J 3/4412* (2013.01); *G01N 21/65* (2013.01); *G06N 20/20* (2019.01); *G01N 2021/95615* (2013.01)

(58) Field of Classification Search
CPC ............ C08L 23/0815; C08L 2203/10; C08L 2205/025; C08L 23/12; G01J 3/4412; G01N 2021/8416; G01N 2021/8883; G01N 2021/95615; G01N 21/65; G01N 21/95; G01N 21/95607; G06N 20/00; G06N 20/20
See application file for complete search history.

(56) References Cited

U.S. PATENT DOCUMENTS

| | | | | |
|---|---|---|---|---|
| 6,127,120 | A * | 10/2000 | Graham | C12Q 1/6816 435/6.14 |
| 7,106,437 | B2 | 9/2006 | Marrow et al. | |
| 2012/0038915 | A1* | 2/2012 | Tsuchida | G01N 21/65 356/301 |
| 2012/0170051 | A1* | 7/2012 | Edelmann | G01B 11/25 356/600 |
| 2014/0185033 | A1* | 7/2014 | Moretto | G01N 21/65 356/51 |
| 2016/0103070 | A1* | 4/2016 | Kyoung | G01N 21/65 356/301 |
| 2019/0321106 | A1* | 10/2019 | Bergman | A61N 1/0534 |
| 2020/0055735 | A1* | 2/2020 | Rubin | C01B 32/184 |

FOREIGN PATENT DOCUMENTS

WO 2017089427 A1 6/2017

* cited by examiner

*Primary Examiner* — Hina F Ayub
(74) *Attorney, Agent, or Firm* — Jeffrey N. Townes; Cozen O'Connor

(57) ABSTRACT

This disclosure relates to methods for determining the quality of polymers, more particularly, polyolefins. The methods involve Raman spectroscopy and artificial intelligence to compute polymer properties and/or features.

24 Claims, 9 Drawing Sheets

RAMAN SPECTROSCOPY AND MACHINE LEARNING FOR QUALITY CONTROL

PRIORITY CLAIM

This application claims priority, under 35 U.S.C. § 119(e), to U.S. Provisional Application No. 62/653,791, filed Apr. 6, 2018, hereby incorporated by reference in its entirety.

FIELD OF THE INVENTION

The present invention relates generally to methods for determining the quality of polymers, more particularly, polyolefins. The methods involve Raman spectroscopy and artificial intelligence.

BACKGROUND

In the manufacturing processes of polymers, the quality of the polymer is typically tested in a laboratory where the polymer properties, such as melt flow, xylene solubles, density, and mechanical properties, are measured according to ASTM procedures. The entire sampling and testing process can take several hours. If the polymer does not meet the specifications, the manufacturing lot is rejected, and the process engineers take corrective actions. As such, this process is expensive, laborious, and slow. Furthermore, due to the typically high production rates at manufacturing plants, a lag time of several hours means that several tons of products are collected before any problem is detected.

Therefore, there is an unmet need in the art to accelerate the quality control process for reducing cost and for providing a quick and reliable feedback for process engineers.

SUMMARY OF THE INVENTION

One aspect of the invention relates to a method for determining the quality of a polymer based on a Raman spectrum of the polymer, the method includes: (i) obtaining, by a polymer property computing device, a Raman spectrum of a polymer sample from a Raman spectrometer, where the Raman spectrum comprises a plurality of peaks and valleys in chemical and structural fingerprints that correspond to one or more polymer properties or features; (ii) computing, by the polymer property computing device, the one or more polymer properties or features by comparing the obtained chemical and structural fingerprints to stored polymer property and feature data, where the computing step is carried out by performing, by the polymer property computing device, one or more trained machine learning algorithms; and (iii) determining, by the polymer property computing device, based on one or more computed polymer properties or features, whether the quality of the polymer sample meets a predetermined quality threshold.

Another aspect of the invention relates to a polymer property computing device including a processor and a memory, where the memory is coupled to the processor configured to execute programmed instructions stored in the memory including: (i) obtain a Raman spectrum of a polymer sample from a Raman spectrometer, wherein the Raman spectrum comprises a plurality of peaks and valleys in chemical and structural fingerprints that correspond to one or more polymer properties or features; (ii) compute the one or more polymer properties or features by comparing the obtained chemical and structural fingerprints to stored polymer property and feature data, wherein the computing step is carried out by performing one or more trained machine learning algorithms; and (iii) determine based on one or more computed polymer properties or features, whether the quality of the polymer sample meets a predetermined quality threshold.

Another aspect of the invention relates to a non-transitory computer readable medium having stored thereon instructions for determining the quality of a polymer based on a Raman spectrum of the polymer comprising machine executable code which when executed by at least one processor, causes the processor to perform steps including: (i) obtaining a Raman spectrum of a polymer sample from a Raman spectrometer, where the Raman spectrum comprises a plurality of peaks and valleys in chemical and structural fingerprints that correspond to one or more polymer properties or features; (ii) computing the one or more polymer properties or features by comparing the obtained chemical and structural fingerprints to stored polymer property and feature data, wherein the computing step is carried out by performing one or more trained machine learning algorithms; and (iii) determining based on one or more computed polymer properties or features, whether the quality of the polymer sample meets a predetermined quality threshold.

DETAILED DESCRIPTION OF THE INVENTION

Raman spectroscopy is an attractive analytical technique for polymeric materials because it is reproducible, requires no sample preparation, and provides spectra with sharp and well-resolved peaks and valleys containing structural and chemical information. Raman spectroscopy uses monochromatic laser light and relies on inelastic scattering. The laser light interacts with molecular vibrations in the polymer, resulting in the energy of the laser photons being shifted.

Figure 1:
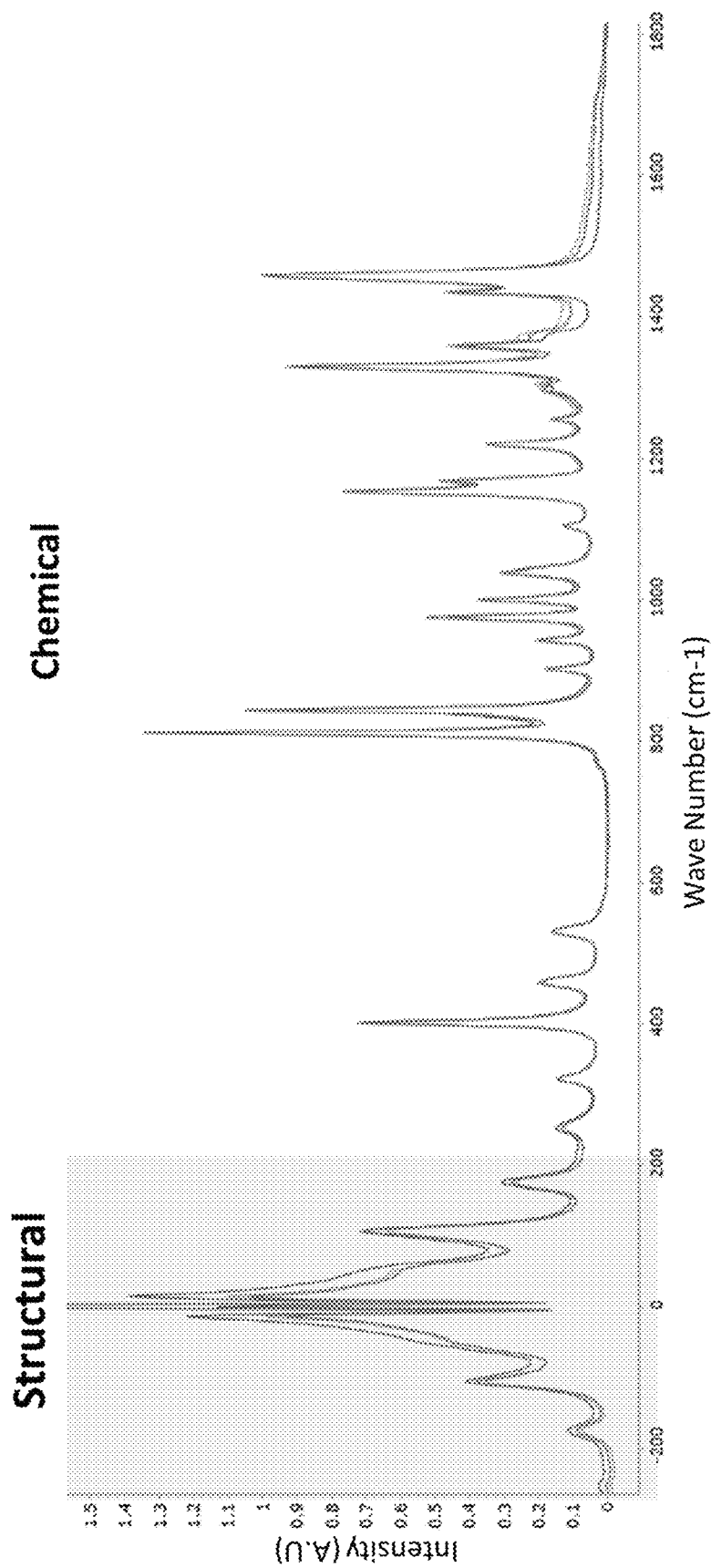
FIG. 1 is a Raman spectrum indicating that the low frequency region, which corresponds to terahertz (THz) frequencies, provides structural information on the polymer while a higher frequency region provides a chemical fingerprint of the polymer.

Recent developments in high performance holographic filters and wavelength-stabilized laser sources allow access to the low-frequency Raman regime (i.e., in the THz frequencies). See FIG. 1. In this regime, polymer chains vibrate in long acoustic modes (LAMs). These vibrations occur on approximately 0.1 to 10 ps timescales and exhibit spectra in the approximately 0.3 to 3.0 THz or 10 $cm^{-1}$ to 100 $cm^{-1}$. Further, these vibrations can be correlated with structural parameters, such as chain length ($M_w$, melt flow), lamellar thickness (crystallinity, % xylene solubles), and stress fields (mechanical properties).

Despite the richness of structural and chemical information in Raman spectrum, it is difficult to create parametric models that reliably correlate the Raman spectrum with properties/features of the polymers. The main difficulty is the data dimensionality. Each point of a spectrum represents the intensity recorded at a particular wavelength. A Raman dataset therefore has one attribute for each point on its constituent spectra, with a typical Raman spectrum having 1,000 to 3,000 pairs of data points (about 3,000 dimensions). Usually the relevant bands are manually selected based on expert knowledge of the spectroscopic behavior of the material and the rest of the information is thrown away.

This manual spectral evaluation is therefore ill suited for online product characterization. Additionally, while the spectral data can be correlated to polymer properties, such as melt flow rates densities, molecular weight distributions, this information is not readily apparent by simply looking at the spectra and making visual observations.

Instead, the disclosed method uses artificial intelligence, more specifically machine learning techniques, to develop a model capable of predicting relevant polymer properties/features from the Raman spectrum. Furthermore, by employing an online non-destructive fingerprinting method and artificial intelligence, real-time estimations of product specifications can be obtained, thus reducing the time and costs associated with using the conventional laboratory equipment for quality control.

Accordingly, one aspect of the invention relates to a method for determining the quality of a polymer based on a Raman spectrum of the polymer, the method includes: (i) obtaining, by a polymer property computing device, a Raman spectrum of a polymer sample from a Raman spectrometer, where the Raman spectrum comprises a plurality of peaks and valleys in chemical and structural fingerprints that correspond to one or more polymer properties or features; (ii) computing, by the polymer property computing device, the one or more polymer properties or features by comparing the obtained chemical and structural fingerprints to stored polymer property and feature data, where the computing step is carried out by performing, by the polymer property computing device, one or more trained machine learning algorithms; and (iii) determining, by the polymer property computing device, based on one or more computed polymer properties or features, whether the quality of the polymer sample meets a predetermined quality threshold.

The acquisition of the Raman spectrum of the polymer sample can be initiated manually or automatically (e.g., programmed into the polymer property computing device).

Exemplary algorithms for computing one or more polymer properties or features include, but are not limited to, Logistic Regression, Naive Bayes, Neural Networks, Deep Learning, and Kernel Machine methods such as Kernel Support Vector Machines Regression, Gaussian Processes, and Kernel Ridge Regression. Combinations of these algorithms may also be used.

In the training of the machine learning algorithm, Raman spectra of known samples are acquired, and the polymer properties/features of the known samples are measured in the laboratory. The polymer properties/features can be measured with methods known to one skilled in the art. For example, the melt flow rate of the sample can be measured per ASTM D1238 using a load of 2.16 kg at 230° C. No particular number of calibration samples is required. One skilled in the art can determine the appropriate number of calibration samples based on the performance of the model and the incremental change in performance with additional calibration data. The polymer properties/features measured include those that the model will compute. The measured polymer properties/features and the acquired Raman spectra are then entered into the polymer property computing device.

For a desired polymer property, the data set including the measured polymer properties/features and the respective Raman spectral data for the samples is ingested into a tabulated, machine-readable database, accessible by an application programming interface (API) or a graphic user interphase.

As most machine learning methods typically perform poorly if the input variables do not have zero mean and unit variance, the input variables are typically scaled to get zero mean and standard deviation equal to one. In other words, the data is transformed to make it readable by the machine learning algorithms. This process is known as feature engineering or variable engineering. During the collection and feature/variable engineering stages, many possible variables are generated, even if some of them are irrelevant. For example, new variables can be generated by applying basic arithmetic operations in between the original features. The feature/variable engineering process can also include: deleting the examples with missing values or replacing missing values for the mean of the given variable, and identifying and removing outliers. Once the proper feature engineering operations have been identified, a "data transformations pipeline" can be written to apply the same variable operations to the data presented to the machine-learning algorithm. The data can be obtained from known samples with measured polymer properties/features or unknown samples.

The next step in the training phase involves feature selection and dimensionality reduction. A particular input feature can be strongly relevant (has information that does not exist in any other feature), relevant, weakly relevant (some information that other features include) or irrelevant. During feature selection, a subset of strongly relevant features is used in model construction. In this step, the one or more peaks and/or valleys are correlated to with the measured properties/features to form a part of polymer property and feature data. For example, peaks at 810 $cm^{-1}$, 841 $cm^{-1}$, 900 $cm^{-1}$, 974 $cm^{-1}$, 999 $cm^{-1}$, 1152 $cm^{-1}$, 1168 $cm^{-1}$, 1220 $cm^{-1}$, 1329 $cm^{-1}$, 1359 $cm^{-1}$, 1436 $cm^{-1}$, and 1459 $cm^{-1}$ can be useful for characterizing the crystallinity, mechanical properties and tacticity of polypropylene (See Julio Banquet-Teran et al., Applied Spectroscopy, 2016, p. 1118-1127, for a discussion of certain peaks attributable to certain polymer properties). THz Low frequency bands at 106 $cm^{-1}$, 171 $cm^{-1}$, 250 $cm^{-1}$, 320 $cm^{-1}$, 398 $cm^{-1}$, 460 $cm^{-1}$, and 530 $cm^{-1}$ can be used to identify crystalline modifications of isotactic polypropylene (α, β, and γ), lamellar thickness, mechanical properties, the length of isotactic segments in the helical conformation and comonomer content (See A Materny at al., Journal of Physics: Conference Series, 2017, p. 1-9, for a general description of useful bands).

The model can be trained using methods known in the art. For instance, the collected data is usually divided into two sets: a training data set (typically about 80% of the collected data) and a testing data set (typically about 20% of the collected data). The training data set is used to develop the model, where the machine learning algorithm is executed to analyze the training data set and produce an inferred function. Since the chosen polymer property/feature for the training data set samples is both computed and measured, the effectiveness of the model can be evaluated by comparing the computed and measured values. An optimization algorithm is typically used to minimize either the empirical-risk or the structural-risk. This can be done by adjusting the inferred function parameters (known as hyper-parameters) so that the error between the known outputs and the model prediction is minimized.

Subsequently, the trained model (i.e., machine learning algorithm) is tasked to compute the polymer properties/features from the testing data set. This is done in order to evaluate the ability of the model to generalize.

The trained model can then be applied to unknown sample spectra to compute the desired polymer property or feature.

The model can be trained to predict one or more polymer properties/features. In some embodiments, separate models are developed for each polymer property/feature. In other embodiments, multiple polymer properties/features can be determined simultaneously by using the model.

Trained models can be further enhanced by ensemble techniques, in which the goal is to combine the predictions of several base estimators built with a given learning algorithm in order to improve generalizability/robustness over a single estimator. Some ensemble methods include bagging methods, forests of randomized trees, AdaBoost, Gradient Tree Boosting, and voting classifiers.

In some embodiments, the method further comprises, before the computing step, classifying, by the polymer property computing device, the peaks and/or valleys in the obtained chemical and structural fingerprints as either a relevant polymer feature or a non-relevant polymer feature. As one illustrative example, peaks at 810 $cm^{-1}$, 974 $cm^{-1}$, and 1168 $cm^{-1}$ may be classified as relevant polymer features because these peaks relate to the crystallinity and tacticity of polypropylene.

In some embodiments, the method further comprises, after the determining step, reporting, by the polymer property computing device, the one or more computed polymer properties or features. For example, the one or more computed polymer properties or features may be displayed on a screen of a computer (e.g., desktop, laptop, tablet, mobile phone, and smart watches).

In some embodiments, the method further comprises refining, by the polymer property computing device, the one or more trained machine learning algorithms at least by repeating the executing step and the adjusting step using the in-process data. The machine learning algorithm is then continuously refined as the product wheel changes, thus improving its predicting capability over time.

The polymer property computing device can determine, based on one or more computed polymer properties or features, whether the quality of the polymer sample meets a predetermined quality threshold, which typically includes acceptable lot-to-lot variations.

When the one or more computed polymer properties or features fall within the acceptable range, the polymer sample can be deemed to meet the quality threshold, and the polymer production process can be continued without further adjustments.

When the one or more computed polymer properties or features fall outside the acceptable range, the polymer sample then does not meet the predetermined quality threshold. Accordingly, the parameters for the polymer production process can be adjusted by the polymer property computing device to achieve the polymer with the desired properties or features. These parameters include, but are not limited to, the amount/concentration of the reactants (e.g., propylene, ethylene, hydrogen), additives, and polymerization catalyst; temperature; and pressure.

Raman Spectroscopy

Raman spectroscopy is a well-known analytical tool for molecular characterization, identification, and quantification. Raman spectroscopy makes use of inelastically scattered radiation from a non-resonant, non-ionizing radiation source, typically a visible or near-infrared radiation source such as a laser, to obtain information about molecular vibrational-rotational states. The Raman spectrum includes information directly or indirectly related to various properties of the polyolefin sample. Raman spectra are typically shown as plots of intensity (arbitrary units) versus "Raman shift," where the Raman shift is the difference in energy or wavelength between the excitation radiation and the scattered radiation. The Raman shift is typically reported in units of wavenumbers ($cm^{-1}$). The spectral range of the Raman spectrum acquired is not particularly limited, but a useful range includes Raman shifts (Stokes and/or anti-Stokes) in the chemical fingerprint region corresponding to a typical range of polyatomic vibrational frequencies, and in the structural fingerprint region corresponding to vibrational modes. The spectral range generally ranges from about $-200$ $cm^{-1}$ to about 4,000 $cm^{-1}$. It should be appreciated, however, that useful spectral information can also be present in higher frequency regions. For example, overtone vibrations (harmonics) contribute to Raman scattering in the region above 4,000 $cm^{-1}$ Raman shift. Thus, if desired, acquisition and use of a Raman spectrum as described herein can include higher frequency spectral regions.

Conversely, the spectral region acquired can be less than all of the $-200$ $cm^{-1}$ to 4,000 $cm^{-1}$ region. For many polyolefins, the majority of Raman scattering-intensity data useful for chemical fingerprints will be present in a region ranging from about 500 $cm^{-1}$ to about 3,500 $cm^{-1}$ or from about 1,000 $cm^{-1}$ to about 3,000 $cm^{-1}$; while the data in the spectral region useful for structural information is typically present in a region ranging from about $-200$ $cm^{-1}$ to about 500 $cm^{-1}$. The region acquired can also include a plurality of sub-regions that need not be contiguous. For instance, the Raman spectral data acquired can include a plurality of frequency or wavelength shift, scattering intensity (x, y) measurements over relatively broad spectral regions, including regions conventionally identified as spectral bands and regions conventionally identified as interband, or unresolved regions.

The frequency spacing of acquired data can be readily determined by one skilled in the art, based on considerations of machine resolution and capacity, acquisition time, data analysis time, information density, and other factors appreciated by one skilled in the art. Similarly, the amount of signal averaging used can be readily determined by one skilled in the art based on machine and process efficiencies and limitations.

Figure 2:
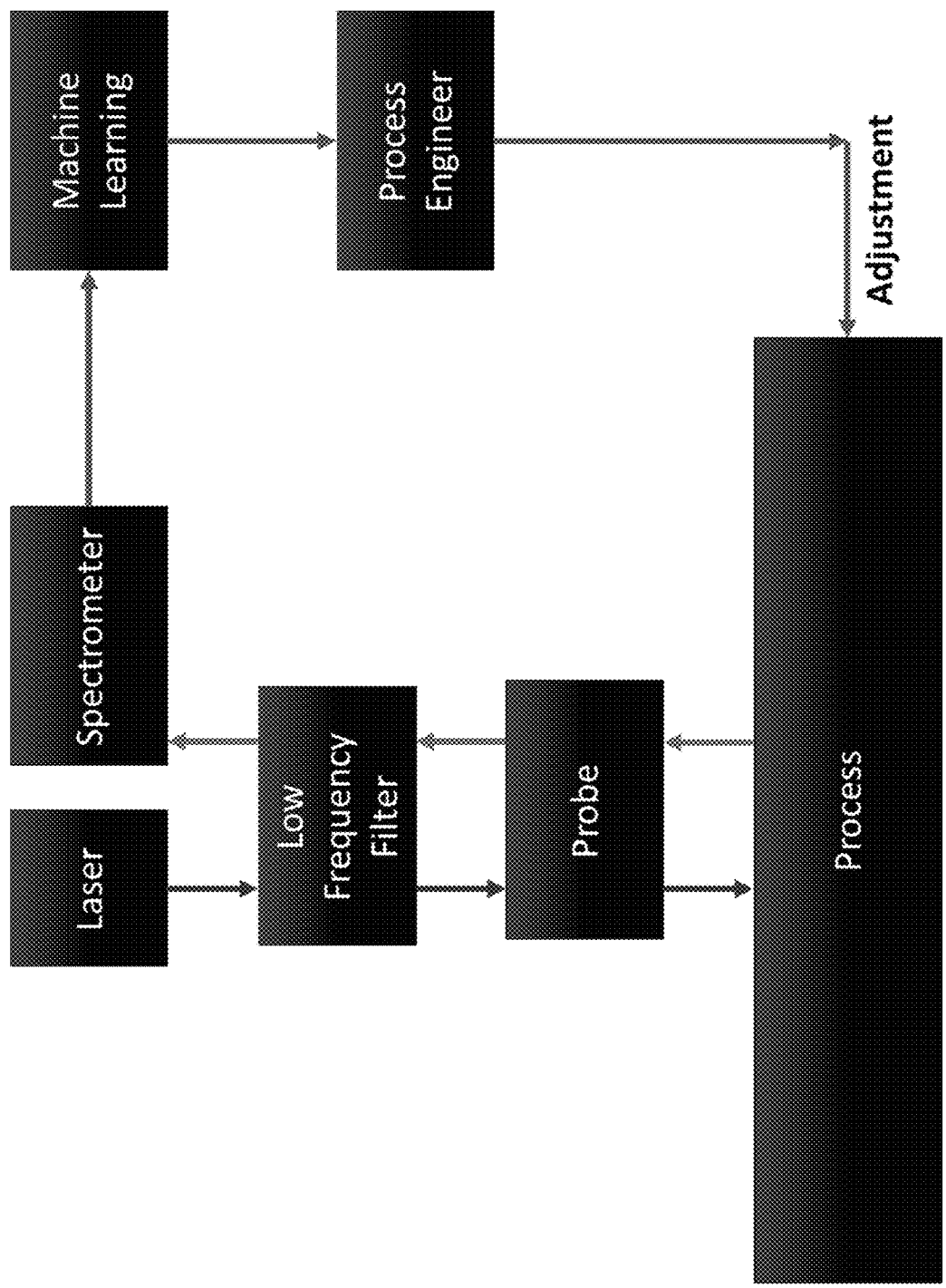
FIG. 2 is a block diagram illustrating the disclosed method in the deployment phase.

Referring now to FIG. 2, the instrumentation used to collect and process Raman data typically includes a Raman spectrometer, a laser source, a low-frequency filter, a Raman probe in communication with the polymer production process, and the machine learning algorithm.

A Raman spectrometer includes an excitation source which delivers excitation radiation to the Raman probe. Scattered radiation is collected within the Raman probe, filtered of Raleigh scattered light, and dispersed via monochromator. The dispersed Raman scattered light is then imaged onto a detector and subsequently processed in by the polymer property computing device, as further described below.

The excitation source and frequency can be readily determined based on considerations well-known in the art. Typically, the excitation source is a visible or near infrared laser, such as a frequency-doubled Nd:YAG laser (532 nm), a helium-neon laser (633 nm), or a solid-state diode laser (such as 785 nm). The laser can be pulsed or continuous wave (CW), polarized as desired or randomly polarized, and preferably single-mode. Typical excitation lasers will have 100 to 400 mW power (CW), although lower or higher power can be used as desired. Light sources other than lasers can be used, and wavelengths and laser types and parameters other than those listed above can also be used. It is well-known that scattering, including Raman scattering, is proportional to the fourth power of the excitation frequency, subject to the practical limitation that fluorescence typically overwhelms the relatively weak Raman signal at higher frequencies. Thus, higher frequency (shorter wavelength) sources are preferred to maximize signal, while lower frequency (longer wavelength) sources are preferred to minimize fluorescence. One skilled in the art can readily determine the appropriate excitation source based on these and other considerations, such as mode stability, maintenance time and costs, capital costs, and other factors well understood in the art.

The excitation radiation can be delivered to the Raman probe, and the scattered radiation collected from the Raman probe, by any convenient means known in the art, such as conventional beam manipulation optics, or fiber optic cables. For an online process measurement, it is particularly convenient to deliver the excitation radiation and collect the scattered radiation fiber-optically. It is a particular advantage of Raman spectroscopy that the excitation radiation typically used is readily manipulated fiber optically, and thus the excitation source can be positioned remotely from the sampling region. A particular fiber optic probe is described below; however, one skilled in the art will appreciate that the Raman system is not limited to any particular means of radiation manipulation.

The scattered radiation is collected and dispersed by any convenient means known in the art, such as a fiber optic probe as described below. The collected scattered radiation is filtered to remove Raleigh scattering, for instance through a low-frequency filter, and optionally filtered to remove fluorescence, then frequency (wavelength) dispersed using a suitable dispersive element, such as a blazed grating or a holographic grating, or interferometrically (e.g., using Fourier transforms). The grating can be fixed or scanning, depending upon the type of detector used. The monochromator can be any such dispersive element, along with associated filters and beam manipulation optics.

The dispersed Raman scattering is imaged onto a detector. The choice of detector is easily made by one skilled in the art, taking into account various factors such as resolution, sensitivity to the appropriate frequency range, and response time. Typical detectors include array detectors generally used with fixed-dispersive monochromators, such as diode arrays or charge coupled devices (CCDs), or single element detectors generally used with scanning-dispersive monochromators, such as lead sulfide detectors and indium-gallium-arsenide detectors. In the case of array detectors, the detector is calibrated such that the frequency (wavelength) corresponding to each detector element is known. The detector response is delivered to the data subsystem which generates a set of frequency shift, intensity (x,y) data points which constitute the Raman spectrum.

The Raman probe couples the Raman spectrometer to the manufacturing process. As noted above, the excitation radiation can be delivered to and collected from the polymer sample by any convenient means, such as using conventional optics or fiber optic cables. The Raman probe can be a conventional Raman probe, a THz-Raman probe, or both. The Raman probe may or may not have immersion optics. Raman probes with immersion optics can be immersed in liquid samples such as molten polymers in the extruder or polymers dissolved in a solvent. For sampling of solid samples (e.g., granules, pellets, or powder), the Raman probes typically do not have immersion optics.

The Raman probe is typically placed at an access point in the production process of the polymer. For example, the access points can be close to where the engineers sample the polymers for quality control such as immediately after the pelletizer and/or after the purge bin. The Raman probe can be located in a pipe or in a small vessel located at the access point.

Polymer

The polymer can be a homopolymer, a copolymer, or a polymer blend. As understood by one skilled in the art, the term "polymer" refers to a polymeric compound prepared by polymerizing monomers, whether of the same or a different kind. The generic term "polymer" thus includes the term "homopolymer," which refers to polymers prepared from only one type of monomer, as well as the term "copolymer" which refers to polymers prepared from two or more different monomers. As used herein, the term "blend" or "polymer blend" generally refers to a physical mixture of two or more polymers which are not chemically combined. Such a blend may be miscible and may or may not be phase separated. The polymer blend may contain one or more domain configurations, which are created by the morphologies of the polymers. The domain configurations can be determined by X-ray diffraction, transmission electron microscopy, scanning transmission electron microscopy, scanning electron microscopy, and atomic force microscopy, or other methods known in the art.

The polymer can be a polyolefin. Exemplary polyolefins include, but are not limited to, polyethylene, polypropylene, polyisobutylene, and homopolymers and copolymers thereof. In some embodiments, the polyolefin is polypropylene homopolymer or a polypropylene-based copolymer, such as an impact copolymer or a random polymer.

As used herein, the polypropylene-based copolymer refers to copolymers containing at least 50 wt % propylene monomer units, based on the weight of the copolymer. Polypropylene-based copolymers are typically prepared by polymerizing propylene and at least one other linear α-olefin, branched α-olefin, or cyclic olefin. The α-olefin and the cyclic olefin may have 2 to 20 carbon atoms, 2 to 16 carbon atoms, or 2 to 12 carbon atoms, including but not limited to ethylene, 1-butene, 2-butene, 1-pentene, 3-methyl-1-butene, 1-hexene, 4-methyl-1-pentene, 3-methyl-1-pentene, 4,6-dimethyl-1-heptene, 1-octene, 1-decene, 1-undecene, 1-dodecene, 1-tetradecene, 1-hexadecene, 1-octadecene, 1-eicosene, norbornene, tetracyclododecene, and combinations thereof. These olefins may each contain one or more heteroatoms such as an oxygen, nitrogen, and/or silicon atom.

The polypropylene-based copolymer can be made up of linear and/or branched polymer chains. Exemplary polypropylene-based copolymer includes an alternating copolymer, a periodic copolymer, a block copolymer, a random copolymer, or an impact copolymer. In some embodiments, the polypropylene-based copolymer is a random copolymer or an impact copolymer optionally containing long chain branches. As used herein, the term "random copolymer" refers to a copolymer in which the different types of monomer units are statistically distributed in the polymer molecules. The polypropylene-based copolymer can be a polypropylene-polyethylene random copolymer in which the content of the ethylene monomer units is typically up to 7 wt %, based on a total weight of the copolymer.

As used herein, the term "impact copolymer" refers to a heterophasic polyolefin copolymer in which one polyolefin is the continuous phase (i.e., the matrix) and an elastomeric phase is uniformly dispersed therein. The impact copolymer includes, for instance, a heterophasic polypropylene copolymer in which the polyphropylene homopolymer is the continuous phase and an elastomeric phase, such as ethylene propylene rubber (EPR), is uniformly distributed therein. The impact copolymer results from an in-reactor process rather than physical blending.

In some embodiments, the polyolefin is polyethylene homopolymer, such as very low density polyethylene, low density polyethylene, linear low density polyethylene, medium density polyethylene, high density polyethylenes, and ultra high molecular weight polyethylene, or a polyethylene-based copolymer such as ethylene vinyl acetate copolymer.

Polymer Properties or Features

The polymer property can be any property relating to the polymer that one skilled in the art can measure analytically through Raman spectroscopy, including molecular weight, melt flow rate, lamellar thickness, crystallinity, xylene solubles, mechanical properties (e.g., tensile or compressive properties), and combinations thereof. As used herein, the term "molecular weight" can refer to number average molecular weight, weight average molecular weight, or Z-average molecular weight.

Mechanical properties can be any mechanical property relating to the polymer known by one skilled in the art, including Young's modulus, tensile strength at yield, elongation at yield on traction, and flexural modulus at 1% secant.

The polymer features can be the amount of one or more additives (e.g., talc, kaolin, glass fiber), if present, and an amount of one or more comonomers, if present. Other polymer features known to one skilled in the art can also be determined through the disclosed process.

Figure 3:
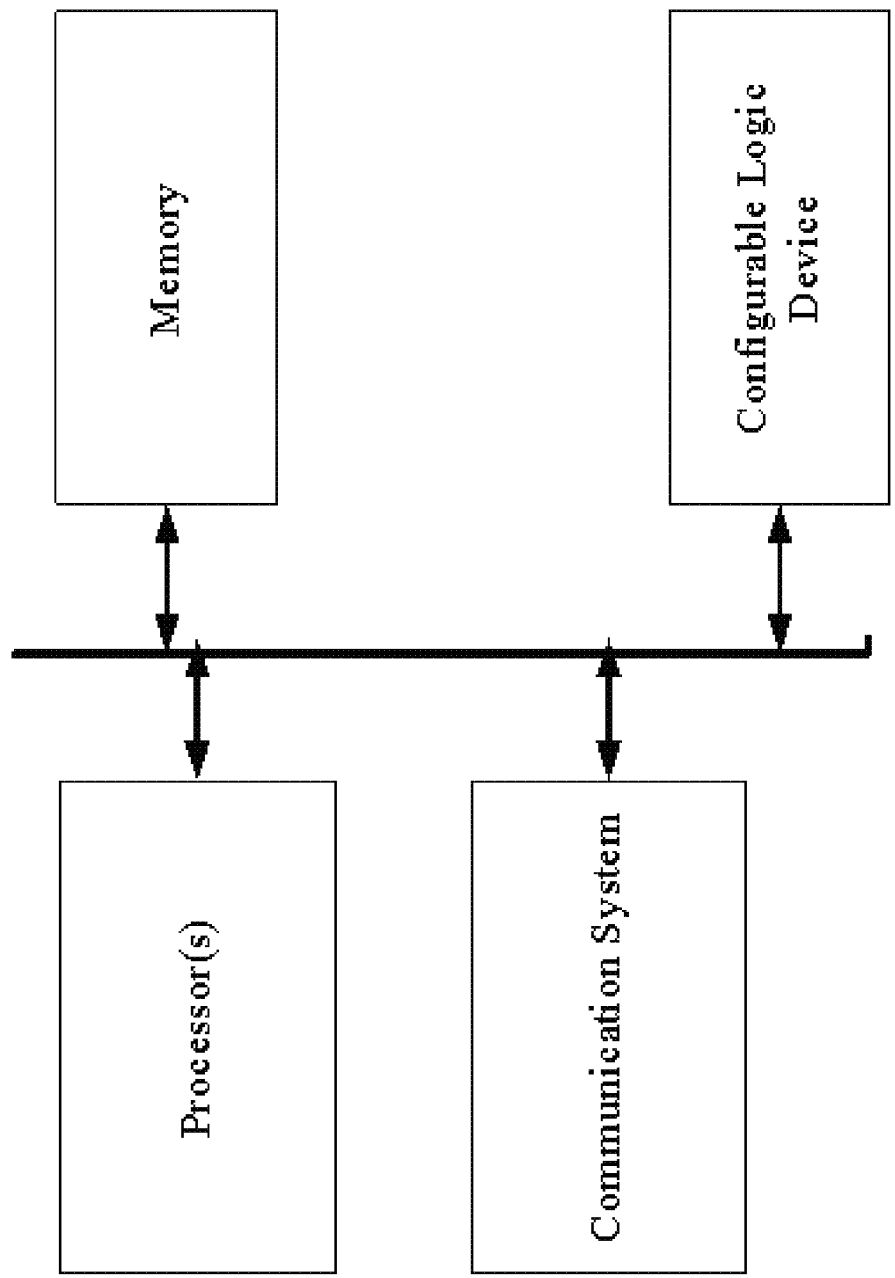
FIG. 3 is a block diagram of a polymer property computing device.

As illustrated in FIG. 3, the polymer property computing device includes processor or central processing unit (CPU), memory, optional configurable hardware logic, and a communication system which are coupled together by a bus device although the polymer property computing device may comprise other types and numbers of elements in other configurations. In this example, the bus is a PCI Express bus in this example, although other bus types and links may be used.

The processors within the polymer property computing device may execute one or more computer-executable instructions stored in memory for the methods illustrated and described with reference to the examples herein, although the processor can execute other types and numbers of instructions and perform other types and numbers of operations. The processor may comprise one or more CPUs or general purpose processors with one or more processing cores, such as AMD® processor(s), although other types of processor(s) could be used (e.g., those produced by Intel®).

Figure 4:
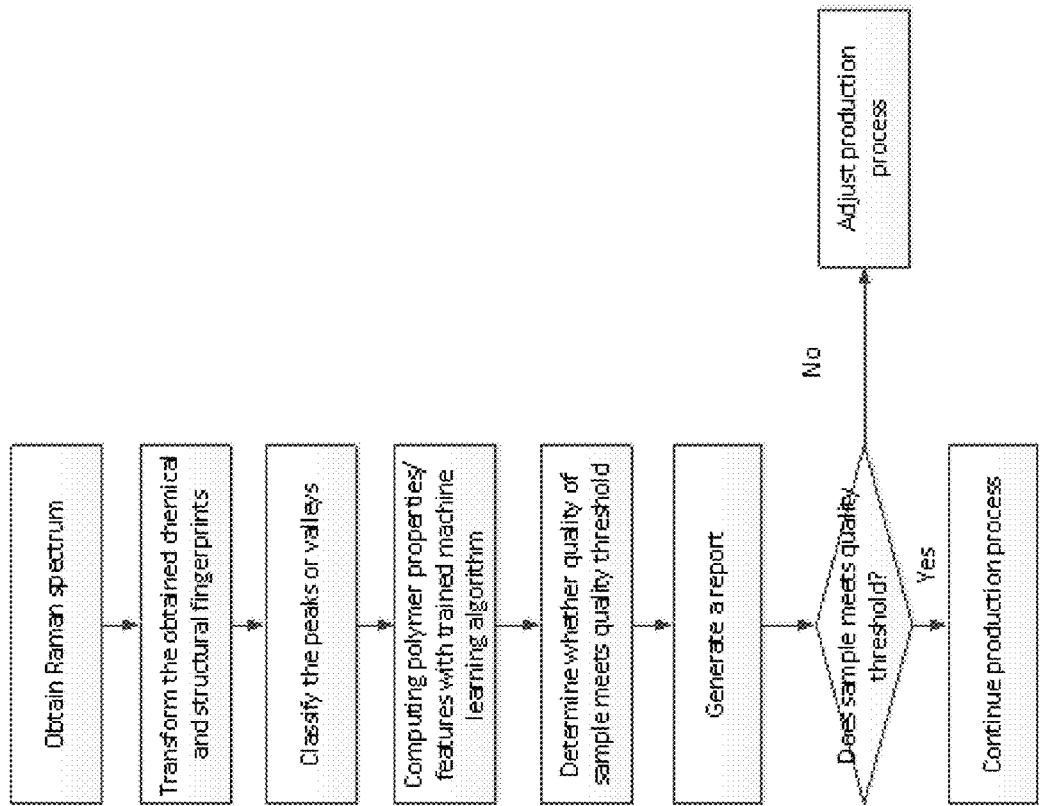
FIG. 4 is a flowchart illustrating an embodiment of the implementation of the disclosed method.
Figure 5:
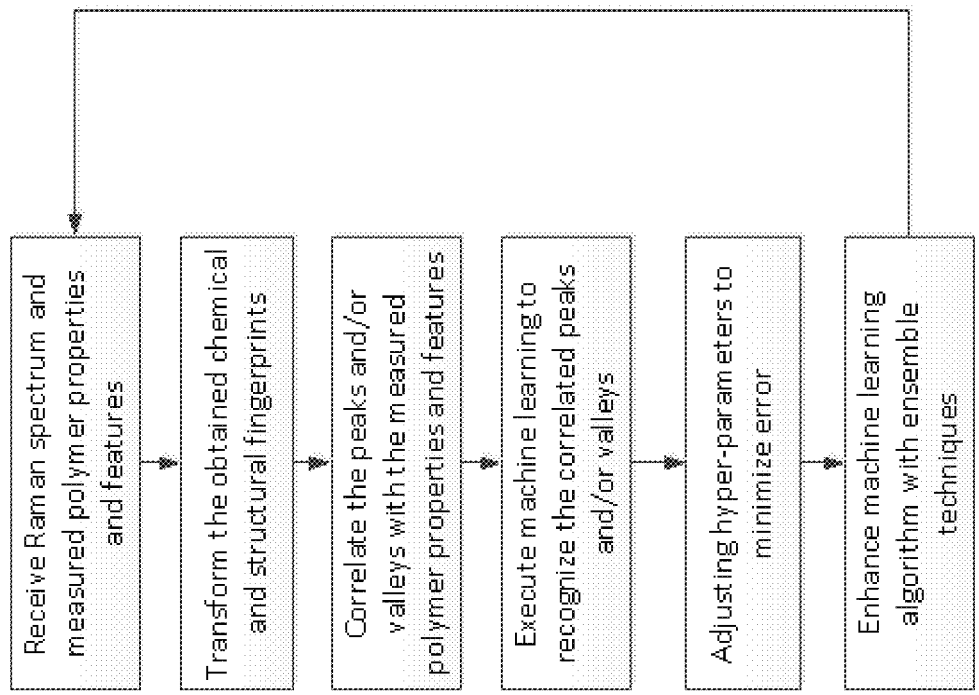
FIG. 5 is a flowchart illustrating an embodiment of the training of the machine learning algorithm.

The memory within the polymer property computing device may comprise one or more tangible storage media, such as RAM, ROM, flash memory, CD-ROM, floppy disk, hard disk drive(s), solid state memory, DVD, or any other memory storage types or devices, including combinations thereof, which are known to those of ordinary skill in the art. The memory may store one or more non-transitory computer-readable instructions of this technology as illustrated and described with reference to the examples herein that may be executed by the processor. The exemplary flowcharts shown in FIGS. 4 and 5 are representative of example steps or actions of this technology that may be embodied or expressed as one or more non-transitory computer or machine readable instructions stored in the memory that may be executed by the processor and/or may be implemented by configured logic in the optional configurable logic.

Accordingly, the memory of the polymer property computing device can store one or more applications that can include computer executable instructions that, when executed by the polymer property computing device, causes the polymer property computing device to perform actions, such as transmit, receive, or otherwise process messages, for example, and to perform other actions described and illustrated with reference to FIGS. 4 and 5. The application(s) can be implemented as module or components of another application; can be implemented as operating system extensions, module, plugins, or the like; can be implemented as module or components of another application; can be implemented as operating system extensions, module, plugins, or the like; may be operative in a cloud-based computing environment; and can be executed within virtual machine(s) or virtual server(s) that may be managed in a cloud-based computing environment. Also, the application(s), including the polymer property computing device itself, may be located in virtual server(s) running in a cloud-based computing environment rather than being tied to one or more specific physical network computing devices. Further, the application(s) may be running in one or more virtual machines (VMs) executing on the polymer property computing device. In at least one of the various embodiments, virtual machine(s) running on the polymer property computing device may be managed or supervised by a hypervisor.

The optional configurable hardware logic device in the polymer property computing device may comprise specialized hardware configured to implement one or more steps of this technology as illustrated and described with reference to the examples herein. By way of example only, the optional configurable logic hardware device may comprise one or more of field programmable gate arrays ("FPGAs"), field programmable logic devices ("FPLDs"), application specific integrated circuits ("ASICs") and/or programmable logic units ("PLUs").

The communication system in the polymer property computing device is used to operatively couple and communicate between the polymer property computing device, and the spectrometer which are all coupled together by communication network, such as one or more local area networks (LAN) and/or the wide area network (WAN), although other types and numbers of communication networks or systems with other types and numbers of connections and configurations to other devices and elements may be used. By way of example only, the communication network such as LAN and WAN can use TCP/IP over Ethernet and industry-standard protocols, including NFS, CIFS, SOAP, XML, LDAP, and SNMP, although other types and numbers of communication networks can be used.

While the polymer property computing device is illustrated in this example as including a single device, the polymer property computing device in other examples can include a plurality of devices or blades each with one or more processors, each processor with one or more processing cores that implement one or more steps of this technology. In these examples, one or more of the devices can have a dedicated communication interface or memory. One or more of the devices can utilize the memory, communication interface, or other hardware or software components of one or more other communicably coupled of the devices. One or more of the devices that together comprise polymer property computing device in other examples can be standalone devices or integrated with one or more other devices or applications. Additionally, one or more of the devices of the polymer property computing device in these examples can be in a same or a different communication network including one or more public, private, or cloud networks, for example.

Each of the systems may be conveniently implemented using one or more general purpose computer systems, microprocessors, digital signal processors, and micro-controllers, programmed according to the teachings, as described and illustrated herein, and as will be appreciated by those of ordinary skill in the art.

The polymer property computing device, for example, may be configured to operate as virtual instances on the same physical machine. In addition, two or more computing systems or devices can be substituted for any one of the systems or devices. Accordingly, principles and advantages of distributed processing, such as redundancy and replication also can be implemented, as desired, to increase the robustness and performance of the devices and systems. The processes may also be implemented on computer system(s) that extend across any suitable network using any suitable interface mechanisms and traffic technologies, including, by way of example, teletraffic in any suitable form (e.g., voice and modem), wireless traffic media, wireless traffic networks, cellular traffic networks, G3 traffic networks, Public Switched Telephone Networks (PSTNs), Packet Data Networks (PDNs), the Internet, intranets, and combinations thereof.

The processes may also be embodied as a non-transitory computer readable medium having instructions stored thereon for one or more aspects of the technology as described and illustrated herein, which, when executed by a processor (or configurable hardware), cause the processor to carry out the steps necessary to implement the processes, as described and illustrated herein.

Accordingly, another aspect of the invention relates to a non-transitory computer readable medium having stored thereon instructions for determining the quality of a polymer based on a Raman spectrum of the polymer comprising machine executable code which when executed by at least one processor, causes the processor to perform steps including: (i) obtaining a Raman spectrum of a polymer sample from a Raman spectrometer, where the Raman spectrum comprises a plurality of peaks and valleys in chemical and structural fingerprints that correspond to one or more polymer properties or features; (ii) computing the one or more polymer properties or features by comparing the obtained chemical and structural fingerprints to stored polymer property and feature data, wherein the computing step is carried out by performing one or more trained machine learning algorithms; and (iii) determining based on one or more computed polymer properties or features, whether the quality of the polymer sample meets a predetermined quality threshold.

Another aspect of the invention relates to a polymer property computing device including a processor and a memory, where the memory is coupled to the processor configured to execute programmed instructions stored in the memory including: (i) obtain a Raman spectrum of a polymer sample from a Raman spectrometer, wherein the Raman spectrum comprises a plurality of peaks and valleys in chemical and structural fingerprints that correspond to one or more polymer properties or features; (ii) compute the one or more polymer properties or features by comparing the obtained chemical and structural fingerprints to stored polymer property and feature data, wherein the computing step is carried out by performing one or more trained machine learning algorithms; and (iii) determine based on one or more computed polymer properties or features, whether the quality of the polymer sample meets a predetermined quality threshold.

Additional aspects, advantages and features of the invention are set forth in this specification, and in part will become apparent to those skilled in the art on examination of the following, or may be learned by practice of the invention. The inventions disclosed in this application are not limited to any particular set of or combination of aspects, advantages and features. It is contemplated that various combinations of the stated aspects, advantages and features make up the inventions disclosed in this application.

EXAMPLES

Figure 6:
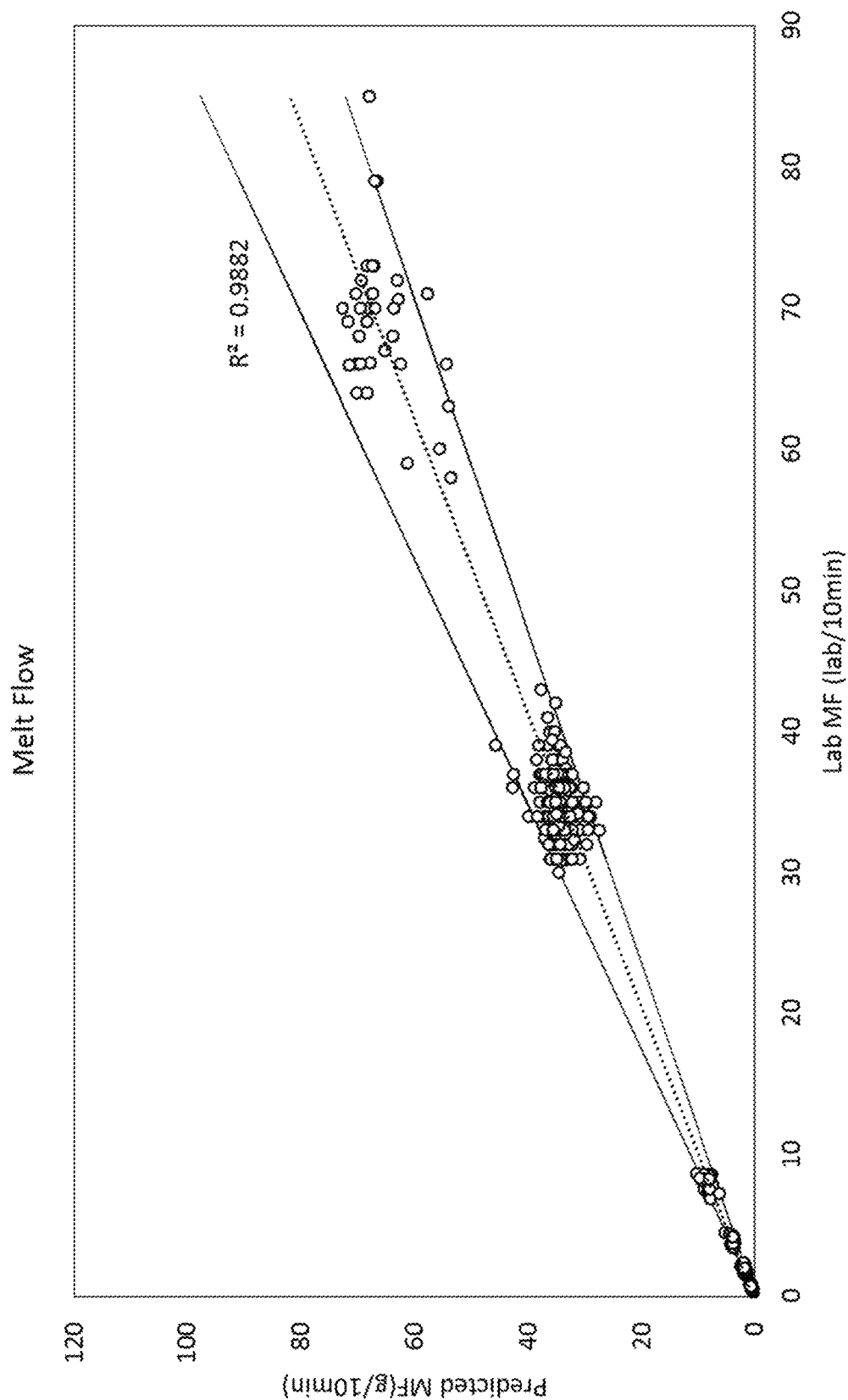
FIG. 6 shows a plot depicting the melt flow as predicted by the machine learning algorithm based on the Raman spectrum versus the true melt flow measured in the laboratory. The dotted line illustrates a perfect match in between the prediction and the real value. The solid lines represent a deviation of +/-20%.
Figure 7:
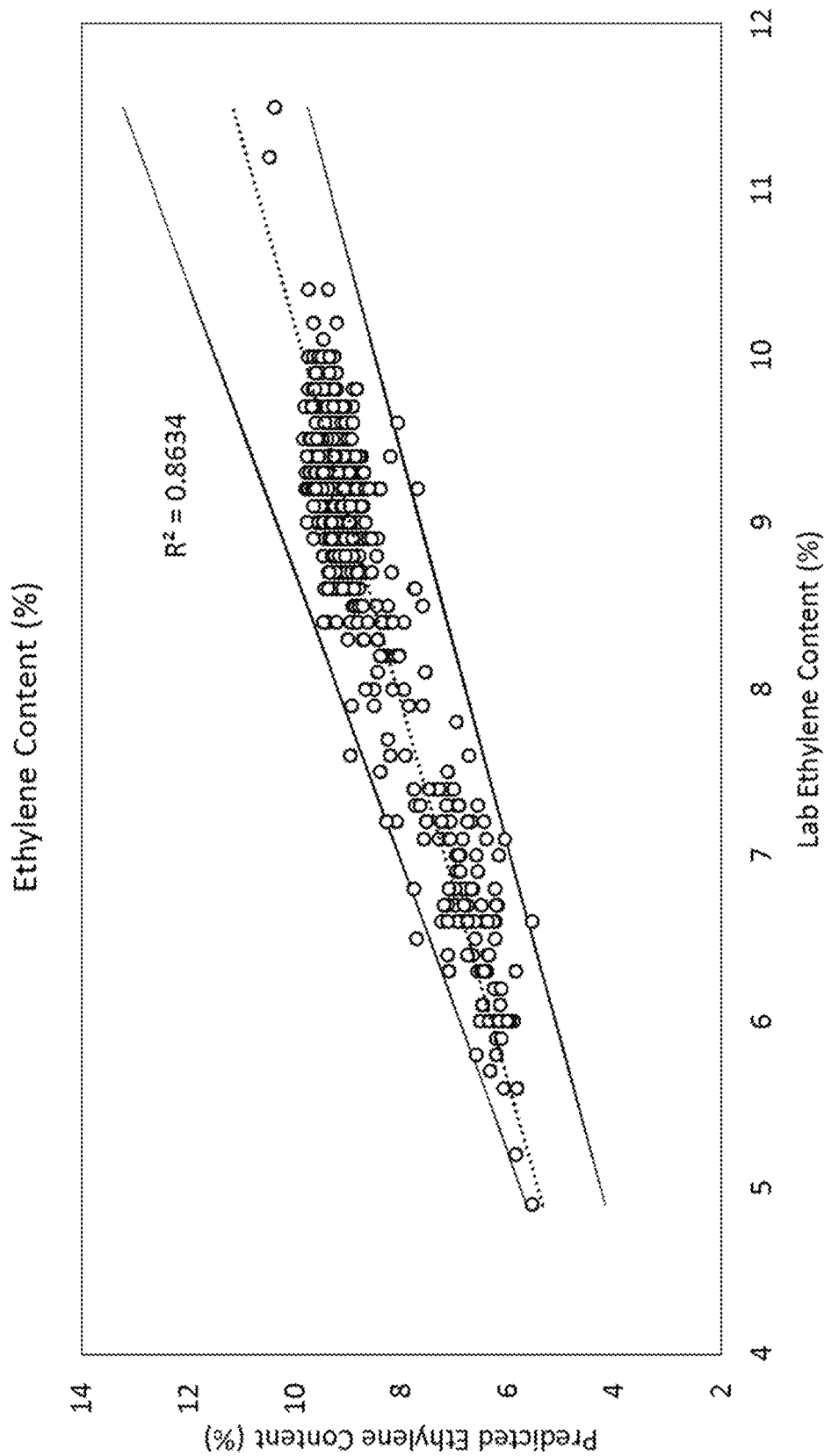
FIG. 7 shows a plot depicting the ethylene % as predicted by the machine learning algorithm based on the Raman spectrum versus the true ethylene % measured in the laboratory. The dotted line illustrates a perfect match in between the prediction and the real value. The solid lines represent a deviation of +/-20%.
Figure 8:
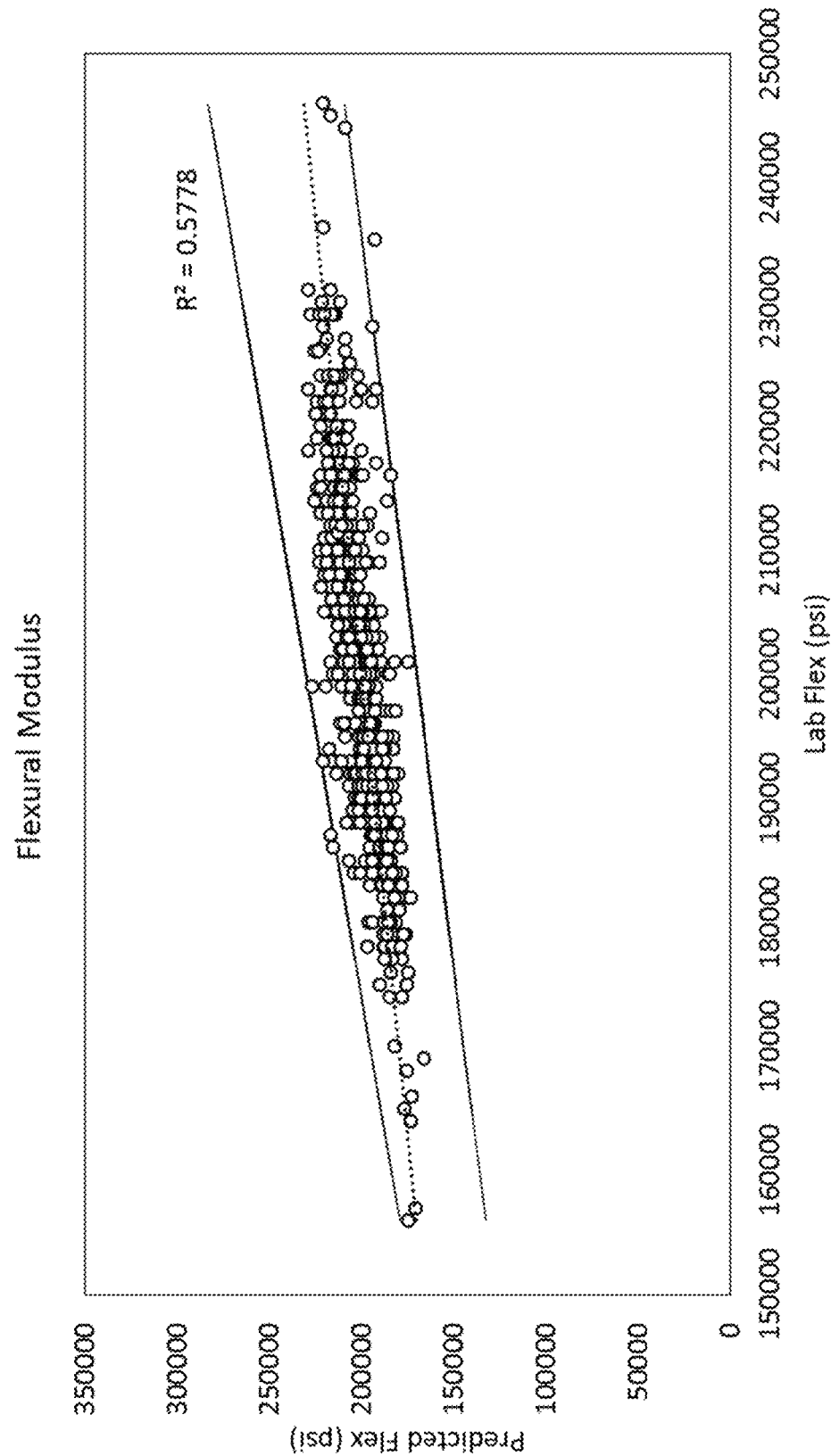
FIG. 8 shows a plot depicting the flexural modulus as predicted by the machine learning algorithm based on the Raman spectrum versus the true flexural modulus measured in the laboratory. The dotted line illustrates a perfect match in between the prediction and the real value. The solid lines represent a deviation of +/-20%.
Figure 9:
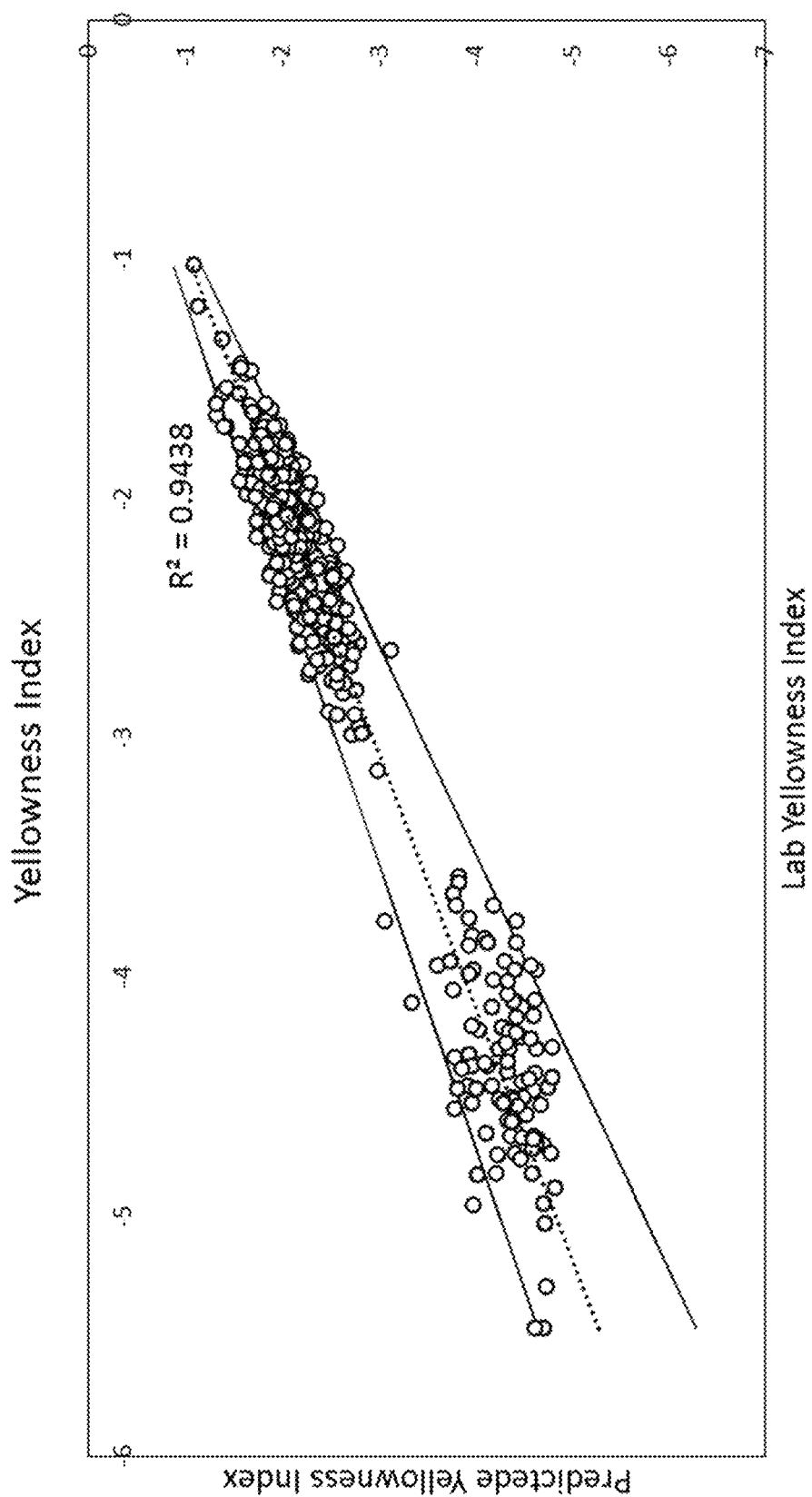
FIG. 9 shows a plot depicting the yellowness index as predicted by the machine learning algorithm based on the Raman spectrum versus the true yellowness index measured in the laboratory. The dotted line illustrates a perfect match in between the prediction and the real value. The solid lines represent a deviation of +/-20%.

Tests were performed on polypropylene to demonstrate that the properties estimated by using Raman spectroscopy and machine learning, as disclosed in this application, correlate with historical measurements of lab data, collected through the methods shown in Table 1, below. The plots, set forth in FIGS. 6-9, show the predicted value of a given property as determined by the machine learning algorithm based on the Raman data versus the actual value of that property measured in the laboratory. In particular, FIG. 6 shows a plot depicting the melt flow as predicted by the machine learning algorithm based on the Raman spectrum versus the true melt flow measured in the laboratory; FIG. 7 shows a plot depicting the ethylene % as predicted by the machine learning algorithm based on the Raman spectrum versus the true ethylene % measured in the laboratory; FIG. 8 shows a plot depicting the flexural modulus as predicted by the machine learning algorithm based on the Raman spectrum versus the true flexural modulus measured in the laboratory; and FIG. 9 shows a plot depicting the yellowness index as predicted by the machine learning algorithm based on the Raman spectrum versus the true yellowness index measured in the laboratory. In each plot, the center lines in the plots are there just to guide the eye, and the center dotted line represents a perfect prediction while the black lines show an interval of plus or minus 20% deviation from the laboratory value.

TABLE 1

| Property being measured | ASTM code | Comments |
| --- | --- | --- |
| Melt Flow | ASTM D1238-13 Procedure B | This is the automatic melt flow procedure (vs manual method) |
| Flexural Modulus | ASTM D4101-11 ASTM D790-10 | D4101 was followed when preparing the samples for testing, and D790 was followed for the testing conditions. |
| Yellowness Index | ASTM D6290-05 | |
| Ethylene Content | | The test is based upon the well-known method reported by S. Di Martino and M. Kelchtermans, entitled "Determination of the Composition of Ethylene-Propylene Rubbers Using 13C-NMR Spectroscopy" J. of Applied Polymer Science, v 56, 1781-1787 (1995). Determination of ethylene content is also shown in U.S. Pat. No. 9,683,096, herein incorporated by reference in its entirety. |

As can be seen from FIGS. 6-9, the machine learning predictions for all properties shown, including melt flow, flexural modulus, yellowness index, and ethylene content, fell within the lines, indicating that the predicted properties are at most 20% above or below the actual measurements.

Based on the results shown in FIGS. 6-9, one skilled in the art can conclude that the disclosed method utilizing a machine learning algorithm based on Raman data is able to estimate, at least with the accuracy indicated, several key quality-control properties of the polymer, including molecular (melt flow), mechanical (flexural modulus), compositional (ethylene %) and visual (yellowness index) properties. While only certain properties have been shown, it would be expected that disclosed method utilizing machine learning algorithm based on Raman data would be able to predict other similar polymer properties and be useful on other polyolefins or polymer compositions.

I claim:

1. A method for determining the quality of a polymer based on a Raman spectrum of the polymer, the method comprising:
    obtaining, by a polymer property computing device, a Raman spectrum of a polymer sample from a Raman spectrometer, wherein the Raman spectrum comprises a plurality of peaks and valleys in chemical and structural fingerprints that correspond to one or more polymer properties or features;
    computing, by the polymer property computing device, the one or more polymer properties or features by comparing the obtained chemical and structural fingerprints to stored polymer property and feature data, wherein the computing step is carried out by performing, by the polymer property computing device, one or more trained machine learning algorithms; and
    determining, by the polymer property computing device, based on one or more computed polymer properties or features, whether the quality of the polymer sample meets a predetermined quality threshold,
    wherein the one or more trained machine learning algorithms are trained by:
        receiving, by the polymer property computing device, both a Raman spectrum and measured polymer properties and features for each of a plurality of known polymer samples;
        correlating, by the polymer property computing device, one or more peaks and/or valleys in the structural and chemical fingerprints of the received Raman spectrum with the measured polymer properties and features to form at least part of the polymer property and feature data;
        executing, by the polymer property computing device, one or more machine learning algorithms to learn to recognize the correlated one or more peaks and/or valleys in the structural and chemical fingerprints and to compute the polymer properties and features;
        adjusting, by the polymer property computing device, one or more hyper-parameters to minimize any errors between the computed polymer properties and features and the measured polymer properties and features; and
        repeating, by the polymer property computing device, at least the executing step and the adjusting step to form the one or more trained machine learning algorithms.

2. The method as set forth in claim 1, further comprising, before the computing step, classifying, by the polymer property computing device, the peaks and/or valleys in the obtained chemical and structural fingerprints as either a relevant polymer property or feature or a non-relevant polymer property or feature.

3. The method as set forth in claim 1, further comprising, before the computing step, transforming, by the polymer property computing device, the obtained Raman spectrum of the polymer sample to a format readable by one or more trained machine learning algorithms.

4. The method as set forth in claim 1, further comprising, after the determining step, reporting, by the polymer property computing device, the one or more computed polymer properties or features.

5. The method as set forth in claim 1, wherein the polymer sample comprises a polyolefin.

6. The method as set forth in claim 5, wherein the polyolefin is polypropylene.

7. The method as set forth in claim 1, wherein the polymer sample is in a form of a pellet.

8. The method as set forth in claim 1, wherein the one or more polymer properties is one or more properties selected from the group consisting of molecular weight, melt flow rate, lamellar thickness, crystallinity, xylene solubles, one or more tensile properties, and one or more compressive properties.

9. The method as set forth in claim 1, further comprising adjusting, by the polymer property computing device, a production process for the polymer based on the one or more computed polymer properties or features.

10. The method as set forth in claim 1, further comprising enhancing, by the polymer property computing device, the one or more trained machine learning algorithms with one or more ensemble techniques.

11. The method as set forth in claim 1, further comprising refining, by the polymer property computing device, the one or more trained machine learning algorithms at least by repeating the executing step and the adjusting step.

12. The method of claim 1, wherein the one or more polymer features is one or more features selected from the group consisting of an amount of one or more additives and an amount of one or more comonomers.

13. A non-transitory computer readable medium having stored thereon instructions for determining the quality of a polymer based on a Raman spectrum of the polymer comprising machine executable code which when executed by at least one processor, causes the processor to perform steps comprising:
   training one or more machine learning algorithms, wherein the training step comprises:
      receiving both a Raman spectrum and measured polymer properties and features for each of a plurality of known polymer samples;
      correlating one or more peaks and/or valleys in the structural and chemical fingerprints of the received Raman spectrum with the measured polymer properties and features to form at least part of the polymer property and feature data;
      executing one or more machine learning algorithms to learn to recognize the correlated one or more peaks and/or valleys in the structural and chemical fingerprints and to compute the polymer properties and features;
      adjusting one or more hyper-parameters to minimize any errors between the computed polymer properties and features and the measured polymer properties and features; and
      repeating at least the executing step and the adjusting step to form the one or more trained machine learning algorithms;
   obtaining a Raman spectrum of a polymer sample from a Raman spectrometer, wherein the Raman spectrum comprises a plurality of peaks and valleys in chemical and structural fingerprints that correspond to one or more polymer properties or features;
   computing the one or more polymer properties or features by comparing the obtained chemical and structural fingerprints to stored polymer property and feature data, wherein the computing step is carried out by performing one or more trained machine learning algorithms; and
   determining based on one or more computed polymer properties or features, whether the quality of the polymer sample meets a predetermined quality threshold.

14. The medium as set forth in claim 13, further comprising, before the computing step, classifying, by the polymer property computing device, the peaks and/or valleys in the obtained chemical and structural fingerprints as either a relevant polymer property or feature or a non-relevant polymer property or feature.

15. The medium as set forth in claim 13, further comprising, after the determining step, reporting, by the polymer property computing device, the one or more computed polymer properties or features.

16. The medium as set forth in claim 13, wherein the polymer sample comprises a polyolefin.

17. The medium as set forth in claim 13, wherein the one or more polymer properties is one or more properties selected from the group consisting of molecular weight, melt flow rate, lamellar thickness, crystallinity, xylene solubles, one or more tensile properties, and one or more compressive properties.

18. The medium of claim 13, wherein the one or more polymer features is one or more features selected from the group consisting of an amount of one or more additives and an amount of one or more comonomers.

19. A polymer property computing device comprising:
   a processor;
   a memory, wherein the memory is coupled to the processor configured to execute programmed instructions stored in the memory comprising:
      obtain a Raman spectrum of a polymer sample from a Raman spectrometer, wherein the Raman spectrum comprises a plurality of peaks and valleys in chemical and structural fingerprints that correspond to one or more polymer properties or features;
      compute the one or more polymer properties or features by comparing the obtained chemical and structural fingerprints to stored polymer property and feature data, wherein the computing step is carried out by performing one or more trained machine learning algorithms; and
      determine based on one or more computed polymer properties or features, whether the quality of the polymer sample meets a predetermined quality threshold;
   wherein the processor is further configured to execute programmed instructions stored in the memory further comprising, training one or more machine learning algorithms before the obtaining step, wherein the training step comprises:
      receiving both a Raman spectrum and measured polymer properties and features for each of a plurality of known polymer samples;
      correlating one or more peaks and/or valleys in the structural and chemical fingerprints of the received Raman spectrum with the measured polymer properties and features to form at least part of the polymer property and feature data;
      executing one or more machine learning algorithms to learn to recognize the correlated one or more peaks and/or valleys in the structural and chemical fingerprints and to compute the polymer properties and features;
      adjusting one or more hyper-parameters to minimize any errors between the computed polymer properties and features and the measured polymer properties and features; and
      repeating at least the executing step and the adjusting step to form the one or more trained machine learning algorithms.

20. The device as set forth in claim 19, wherein the processor is further configured to execute programmed instructions stored in the memory further comprising, before the computing step, classifying, by the polymer property computing device, the peaks and/or valleys in the obtained chemical and structural fingerprints as either a relevant polymer property or feature or a non-relevant polymer property or feature.

21. The device as set forth in claim 19, wherein the processor is further configured to execute programmed instructions stored in the memory further comprising, after the determining step, reporting, by the polymer property computing device, the one or more computed polymer properties or features.

22. The device as set forth in claim 19, wherein the polymer sample comprises a polyolefin.

23. The device as set forth in claim 19, wherein the one or more polymer properties is one or more properties selected from the group consisting of molecular weight, melt flow rate, lamellar thickness, crystallinity, xylene solubles, one or more tensile properties, and one or more compressive properties.

24. The device of claim 19, wherein the one or more polymer features is one or more features selected from the group consisting of an amount of one or more additives and an amount of one or more comonomers.

* * * * *